US011883993B2

(12) United States Patent
Fang et al.

(10) Patent No.: US 11,883,993 B2
(45) Date of Patent: Jan. 30, 2024

(54) DIE-FORMED CHAMFERED PLASTIC FLOOR AND PREPARATION METHOD THEREOF

(71) Applicant: Zhejiang Tianzhen Technology Co., Ltd, Huzhou (CN)

(72) Inventors: Qinghua Fang, Huzhou (CN); Wenjin Tang, Huzhou (CN); Zemin Zhu, Huzhou (CN); Jianying Xia, Huzhou (CN)

(73) Assignee: ZHEJIANG TIANZHEN TECHNOLOGY CO., LTD., Huzhou (CN)

( * ) Notice: Subject to any disclaimer, the term of this patent is extended or adjusted under 35 U.S.C. 154(b) by 0 days.

(21) Appl. No.: 17/862,044

(22) Filed: Jul. 11, 2022

(65) Prior Publication Data
US 2023/0211535 A1 Jul. 6, 2023

(30) Foreign Application Priority Data

Dec. 30, 2021 (CN) .......................... 202111652135.2

(51) Int. Cl.
*B29C 48/00* (2019.01)
*B29C 48/14* (2019.01)
*B29C 48/154* (2019.01)
*B29C 48/16* (2019.01)
*B29C 48/07* (2019.01)
(Continued)

(52) U.S. Cl.
CPC ........ *B29C 48/0021* (2019.02); *B29C 48/002* (2019.02); *B29C 48/022* (2019.02); *B29C 48/07* (2019.02); *B29C 48/14* (2019.02); *B29C 48/154* (2019.02); *B29C 48/16* (2019.02); *B29C 2791/001* (2013.01); *B29C 2791/004* (2013.01); *B29C 2948/92542* (2019.02);
(Continued)

(58) Field of Classification Search
CPC . B29C 48/0021; B29C 48/002; B29C 48/022; B29C 48/07; B29C 48/14; B29C 48/154; B29C 48/16; B29C 2791/001; B29C 2791/004; B29C 2948/92542; B29C 2948/92704; B29K 2027/06; B29L 2007/002
See application file for complete search history.

(56) References Cited

U.S. PATENT DOCUMENTS

2017/0152666 A1* 6/2017 Li .................... B32B 27/304
2019/0368204 A1* 12/2019 Wang .................. B32B 27/306
2021/0310259 A1* 10/2021 Zhang ...................... B32B 3/30

OTHER PUBLICATIONS

Translation for CN-110157115-A, Lin et al (Year: 2019).*
Translation for CN-110105691-A, Wu et al, (Year: 2019).*

* cited by examiner

*Primary Examiner* — Nathan L Van Sell
(74) *Attorney, Agent, or Firm* — Dinsmore & Shohl LLP

(57) ABSTRACT

A die-formed chamfered plastic floor and a preparation method thereof are disclosed. The method includes: mixing raw materials for preparing a plastic floor matrix to obtain a mixed material; subjecting the mixed material to an extrusion, a laminating-embossing treatment, a die forming-chamfering treatment, a coating with an ultraviolet curable paint, a slicing, and a tenoning in sequence, to obtain the die-formed chamfered plastic floor. In the disclosure, a die forming-chamfering treatment is set between a laminating-embossing treatment and a coating with an ultraviolet curable paint, and thereby a chamfer embossing could be formed on the surface of the workpiece through pressing.

8 Claims, 6 Drawing Sheets

(51) Int. Cl.
  *B29K 27/06* (2006.01)
  *B29L 7/00* (2006.01)
(52) U.S. Cl.
  CPC .............. *B29C 2948/92704* (2019.02); *B29K 2027/06* (2013.01); *B29L 2007/002* (2013.01)

DIE-FORMED CHAMFERED PLASTIC FLOOR AND PREPARATION METHOD THEREOF

CROSS REFERENCE TO RELATED APPLICATION

This patent application claims the benefit and priority of Chinese Patent Application No. 202111652135.2 filed on Dec. 30, 2021, the disclosure of which is incorporated by reference herein in its entirety as part of the present application.

TECHNICAL FIELD

The present disclosure relates to the technical field of decoration materials, in particular to a die-formed chamfered plastic floor and a preparation method thereof.

BACKGROUND ART

Plastic floors, i.e., floors formed by plastic materials, can be divided into various types such as polyvinyl chloride (PVC) plastic floor, polyethylene (PE) plastic floor and polypropylene (PP) plastic floor according to raw materials of matrix. PVC exhibits good flame resistance, self-extinguishing property, and it is easy to control its performances. Thus, PVC plastic floor is the most widely used at present. Traditional methods for preparing plastic floors generally include a mixing of raw materials, an extrusion, a laminating-embossing treatment, a coating with an ultraviolet curable paint, a slicing and a tenoning in sequence. When a plastic floor is prepared by the above method, an inclined plane with a certain angle and width is provided by cutting with a cutter in the process of tenoning and thereby a chamfering effect is achieved, resulting in that the size of a chamfer formed is limited by the thickness of a wear-resistant layer of the plastic floor, and that the design of irregular-shaped chamfer could not be realized.

SUMMARY

An object of the present disclosure is to provide a die-formed chamfered plastic floor and a preparation method thereof. The method according to the present disclosure results in a chamfer with a large depth and an easier control of the shape, which may be regular-shaped or special-shaped.

In order to achieve the above object, the present disclosure provides the following technical solutions.

The present disclosure provides a method for preparing a die-formed chamfered plastic floor, comprising the following steps:
  mixing raw materials for preparing a plastic floor matrix, to obtain a mixed material; and
  subjecting the mixed material to an extrusion, a laminating-embossing treatment, a die forming-chamfering treatment, a coating with an ultraviolet curable paint, a slicing, and a tenoning in sequence, to obtain the die-formed chamfered plastic floor.

In some embodiments, the raw materials for preparing the plastic floor matrix include, in parts by mass, 100 parts of polyvinyl chloride, 200-400 parts of calcium carbonate, 5-10 parts of a stabilizer, 0.6-6 parts of a lubricant, and 5-20 parts of a processing agent.

In some embodiments, the mixing is carried out by a high-rate stirring and a low-rate stirring sequentially, the high-rate stirring having a rate of 550-650 r/min, and the low-rate stirring having a rate of 250-350 r/min.

In some embodiments, the extrusion is carried out under conditions including a temperature of 150-210° C., a host rotating speed of 18-25 r/min, and a current of 110-160 A.

In some embodiments, the laminating-embossing treatment includes at a temperature of 150-200° C., laminating a color film and a wear-resistant layer onto one side of a matrix plate obtained from the extrusion.

In some embodiments, the die forming-chamfering treatment includes pressing a laminated embossed workpiece obtained from the laminating-embossing treatment by using a template engraved with a chamfer frame, to form a chamfer embossing on a surface of the laminated embossed workpiece, such that the laminated embossed workpiece has a chamfer.

In some embodiments, the pressing includes a first pressing and a second pressing carried out sequentially; the first pressing is carried out at a temperature of 120-130° C. and a pressure of 4-6 MPa for 5-10 s; and the second pressing is carried out at a temperature of 120-130° C. and a pressure of 10-19 MPa for 3-8 s.

In some embodiments, the coating with an ultraviolet curable paint includes: applying an ultraviolet curable paint onto a surface of the wear-resistant layer of a die-formed chamfered workpiece obtained from the die forming-chamfering treatment, and curing by irradiating with an ultraviolet lamp, to form an ultraviolet cured paint layer on the surface of the wear-resistant layer.

In some embodiments, the ultraviolet curable paint comprises a primer paint and a topcoat paint, and the coating with the ultraviolet curable paint specifically includes: applying the primer paint and the topcoat paint onto a surface of the wear-resistant layer sequentially in an independent amount of 6-8 g/m² respectively, and curing by irradiating with an ultraviolet lamp, to form a primer layer and a topcoat layer on the surface of the wear-resistant layer sequentially.

The present disclosure provides a die-formed chamfered plastic floor prepared by the method as described in the above technical solutions, which has a chamfer in a depth of 0.6-1.2 mm and with a regular shape or special shape.

The present disclosure provides a method for preparing a die-formed chamfered plastic floor, which comprises the following steps: mixing raw materials for preparing a plastic floor matrix to obtain a mixed material; subjecting the mixed material to an extrusion, a laminating-embossing treatment, a die forming-chamfering treatment, a coating with an ultraviolet curable paint, a slicing, and a tenoning in sequence, to obtain the die-formed chamfered plastic floor. In the present disclosure, a die forming-chamfering treatment is set between a laminating-embossing treatment and a coating with an ultraviolet curable paint, and thereby a chamfer embossing could be formed on the surface of the workpiece through the pressing, such that the workpiece has a chamfer. Therefore, it is not necessary to use a cutter to cut an inclined plane with a certain angle and width during the tenoning process according to the traditional process to realize a chamfering effect. The method according to the present disclosure results in a chamfer with a larger depth and an easy control of the shape, which may be regular-shaped or special-shaped, and could be achieved by selecting a corresponding template according to actual needs when performing a die forming-chamfering treatment, thereby providing a rich paving appearance of the floor. Further, the method according to the present disclosure has a simple operation and is suitable for large-scale production.

DETAILED DESCRIPTION OF THE EMBODIMENTS

Figure 1:
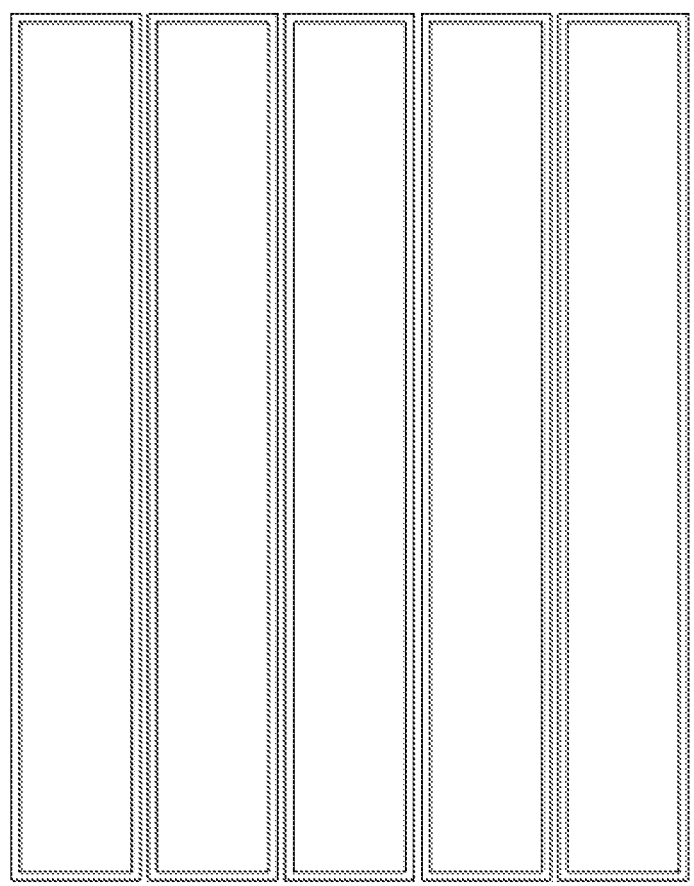
FIG. 1 shows a pictorial diagram of a steel plate engraved with a chamfered frame according to an embodiment of the present disclosure.
Figure 2:
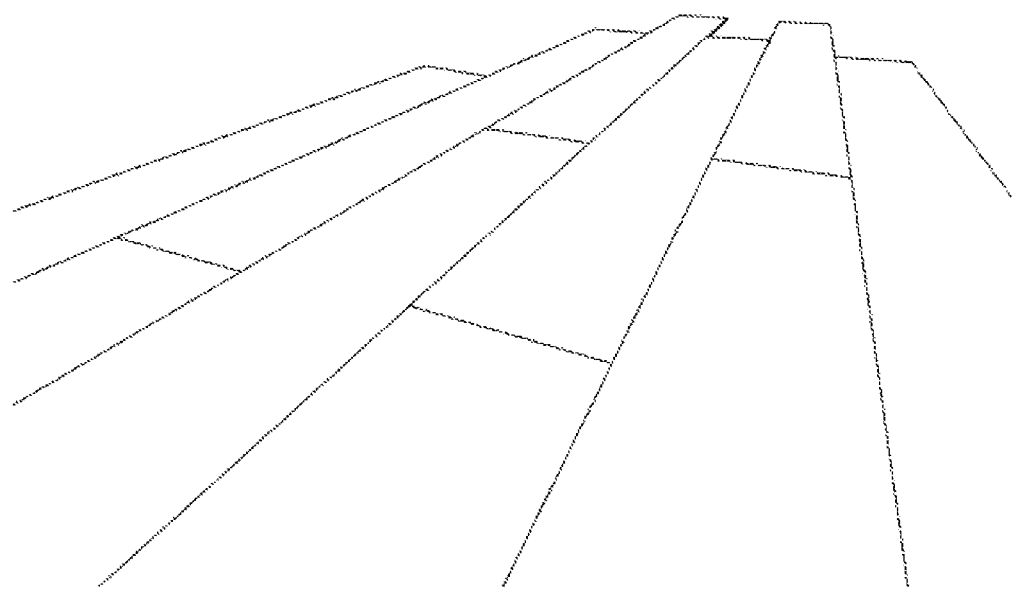
FIGS. 2-6 are diagrams showing assembling effects of the die-formed chamfered plastic floor according to an embodiment of the present disclosure.
Figure 3:
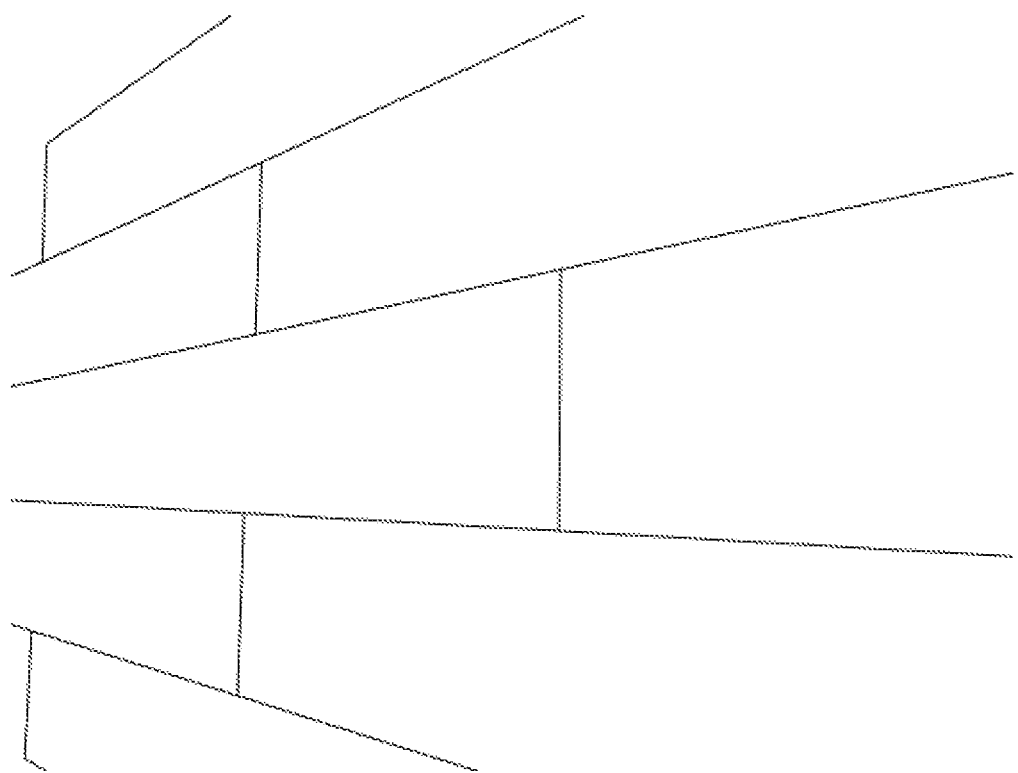
Figure 4:
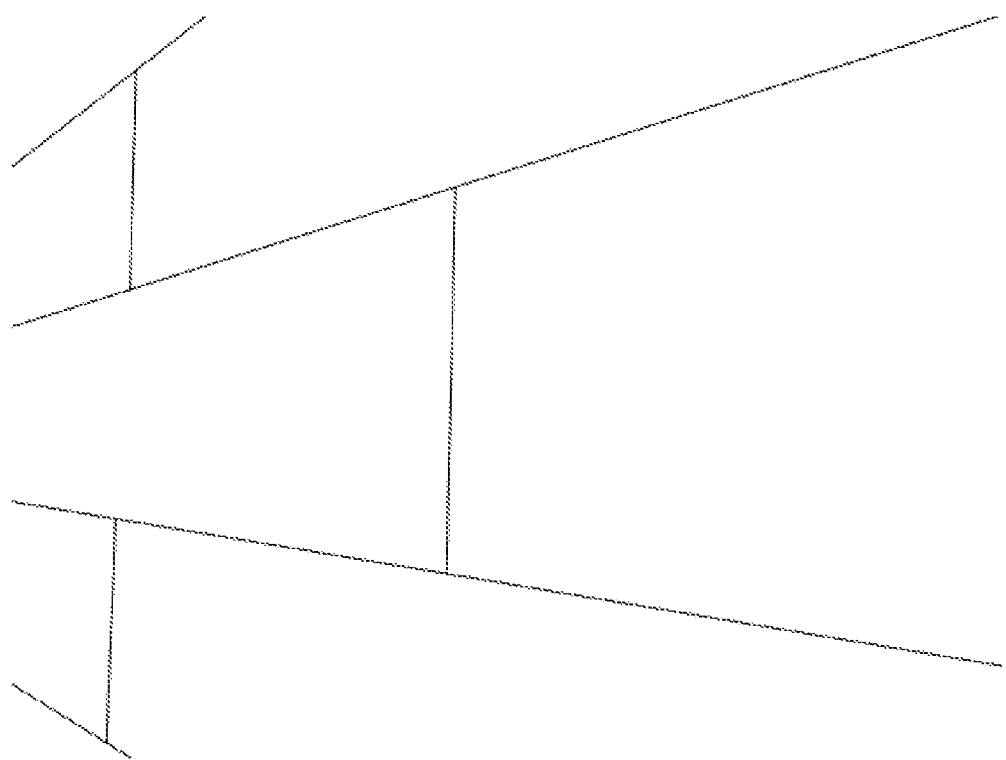
Figure 5:
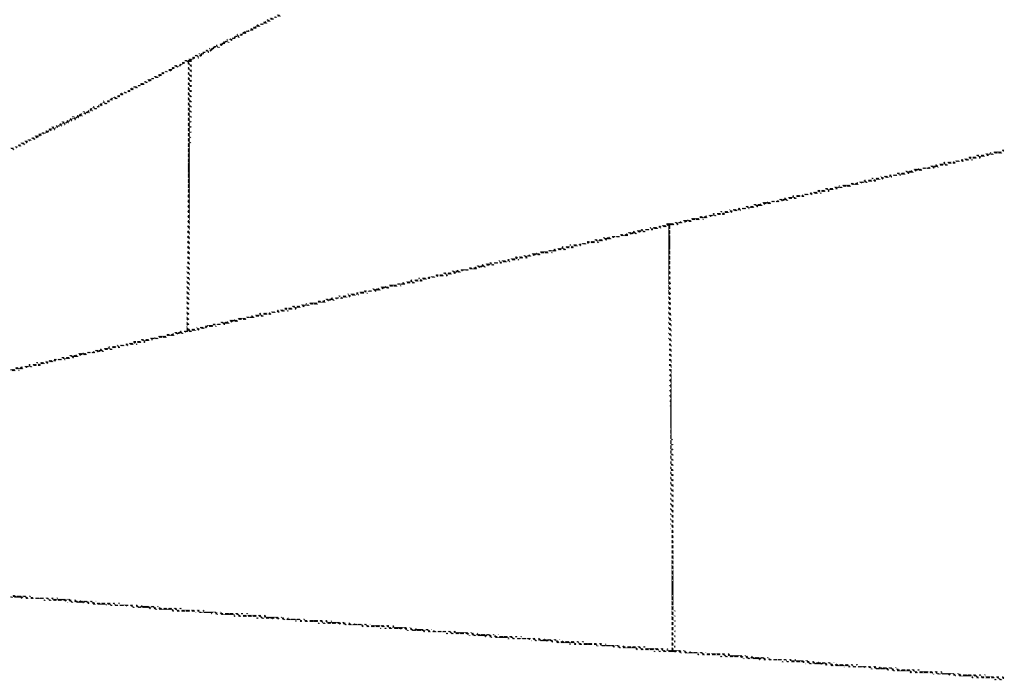
Figure 6:
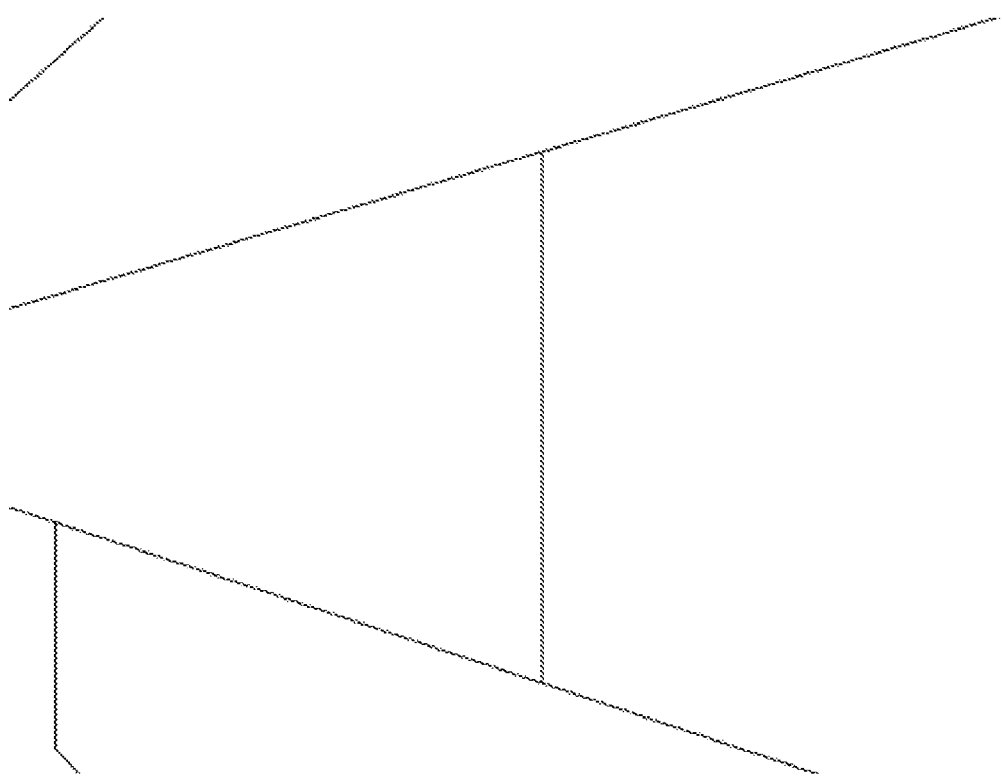

The present disclosure provides a method for preparing a die-formed chamfered plastic floor, comprising the following steps:

mixing raw materials for preparing a plastic floor matrix, to obtain a mixed material; and subjecting the mixed material to an extrusion, a laminating-embossing treatment, a die forming-chamfering treatment, a coating with an ultraviolet curable paint, a slicing, and a tenoning in sequence, to obtain the die-formed chamfered plastic floor.

Firstly, the raw materials for preparing a plastic floor matrix in the present disclosure are described. In some embodiments, the raw materials for preparing the plastic floor matrix include, in parts by mass, 100 parts of polyvinyl chloride, 200-400 parts of calcium carbonate, 5-10 parts of a stabilizer, 0.6-6 parts of a lubricant, and 5-20 parts of a processing agent, which will be described in detail below.

In some embodiments, the raw materials for preparing the plastic floor matrix include 100 parts of polyvinyl chloride which is the main material of the plastic floor matrix.

In some embodiments, in relative to the mass parts of polyvinyl chloride, the raw materials for preparing the plastic floor matrix include 200-400 parts, preferably 300-350 parts of calcium carbonate. In the present disclosure, calcium carbonate is used as an inorganic filler, which is conducive to increasing the dimensional stability of product and reducing cost.

In some embodiments, in relative to the mass parts of polyvinyl chloride, the raw materials for preparing the plastic floor matrix include 5-10 parts, preferably 7-8 parts of a stabilizer. In some embodiments, the stabilizer is a calcium zinc composite stabilizer. In the present disclosure, the stabilizer could improve the processing thermal stability of PVC.

In some embodiments, in relative to the mass parts of polyvinyl chloride, the raw materials for preparing the plastic floor matrix in the present disclosure include 1.6-6 parts, preferably 4-6 parts of a lubricant. In some embodiments, the lubricant includes an external lubricant and an internal lubricant. In some embodiments, a mass ratio of the external lubricant to the internal lubricant is in the range of (1.0-1.5):1, preferably (1.1-1.4):1. There is no special restriction on the types of the external lubricant and the internal lubricant in the present disclosure, and external lubricants and internal lubricants well known to those skilled in the art may be used. In the present disclosure, the internal lubricant exhibits good compatibility with PVC, which is conducive to reducing the viscosity of molten PVC and improving its fluidity; and the external lubricant exhibits poor compatibility with PVC, and could form a lubricating layer at the interface to facilitate flow and product demoulding.

In some embodiments, in relative to the mass parts of polyvinyl chloride, the raw materials for preparing the plastic floor matrix include 5-20 parts, preferably 5-12 parts of a processing agent. There is no special restriction on the type of the processing agent, and processing agents well known to those skilled in the art may be used. In the present disclosure, the use of processing agent is conducive to improving melt strength, foaming and processing fluidity of the system.

In the present disclosure, the raw materials for preparing the plastic floor matrix are mixed to obtain a mixed material. In some embodiments, the mixing is carried out by a high-rate stirring and low-rate stirring in sequence. In some embodiments, the high-rate stirring rate has a rate of 550-650 r/min, preferably 600 r/min. In some embodiments, the low-rate stirring has a rate of 250-350 r/min, preferably 300 r/min. In the present disclosure, under the condition of a high-rate stirring, the temperature of the materials would rise due to shear heat. In some embodiments, when the temperature of the materials rises to 110-115° C., the high-rate stirring is ended, and the low-rate stirring is started. Under the condition of the low-rate stirring, the temperature of the materials would gradually decrease. In some embodiments, when the temperature of the materials decreases to 50-60° C., the low-rate mixing is ended, to obtain the mixed material. In some embodiments, the raw materials for preparing the plastic floor matrix are mixed under the above conditions, which are conducive to realizing a uniform dispersion of the raw materials; the raw materials would be pre-plasticized during the high-rate stirring, giving a convenience for subsequent extrusion process.

After obtaining the mixed raw material, the mixed raw material are subjected to an extrusion, a laminating-embossing treatment, a die forming-chamfering treatment, a coating with an ultraviolet curable paint, a slicing, and a tenoning in sequence to obtain the die-formed chamfered plastic floor. Processes for preparing the die-formed chamfered plastic floor will be described in detail below.

In the present disclosure, the mixed material is subjected to the extrusion to obtain a matrix plate. In some embodiments, the extrusion is carried out under conditions comprising a temperature of 150-210° C., preferably 170-180° C.; a host rotating speed of 18-25 r/min, preferably 20-23 r/min; and a current of 110-160 A, preferably 120-130 A.

After the extrusion, the matrix plate is subjected to the laminating-embossing treatment to obtain a laminated embossed workpiece. In some embodiments, the laminating-embossing treatment is carried out by laminating a color film and a wear-resistant layer onto one side of the matrix plate. There is no special restriction on the types of the color film and the wear-resistant layer, and color films and wear-resistant layers well known to those skilled in the art may be used. In some embodiments, the laminating is carried out at a temperature of 150-200° C., preferably 170-180° C.

After the laminating-embossing treatment, the laminated embossed workpiece is subjected to the die forming-chamfering treatment to obtain a die-formed chamfered workpiece. In some embodiments, the die forming-chamfering treatment is carried out by pressing the laminated embossed workpiece by using a template engraved with a chamfer frame, to form a chamfer embossing on a surface of the laminated embossed treated workpiece, such that the laminated embossed workpiece has a chamfer. In some embodiments, the template is a steel plate. In some embodiments, the pressing includes a first pressing and a second pressing performed sequentially. In some embodiments, the first pressing and the second pressing are carried out independently at a temperature of 120-130° C., and preferably 125° C. In some embodiments, the first pressing is carried out at a pressure of 4-6 MPa, and preferably 5 MPa. In some embodiments, the first pressing is carried out for 5-10 s, and preferably 6 s. In some embodiments, the second pressing is carried out at a pressure of 10-19 MPa, and preferably 18 MPa. In some embodiments, the second pressing is carried out for 3-8 s, and preferably 4 s. In some embodiments, through the pressing under the above conditions, it is possible to imprint the chamfer frame engraved on the steel plate to the laminated embossed workpiece, thereby forming a desired-shaped chamfer on the laminated embossed workpiece while ensuring no scald on the surface of the laminated embossed workpiece and no cracking in matrix. By using the method of the present disclosure, it is convenient to adjust the depth and shape of the chamfer according to actual needs. In some embodiments, the chamfer may have a depth in the range of 0.6-1.2 mm, and specifically 1.0 mm. In some embodiments, the chamfer may be regular-shaped or special-shaped, which may be obtained by using a template engraved with a corresponding chamfer frame according to actual needs.

After the die forming-chamfering treatment, the obtained die-formed chamfered workpiece is subjected to the coating with the ultraviolet curable paint to obtain a workpiece coated with the ultraviolet curable paint. In some embodiments, the coating with the ultraviolet curable paint includes applying the ultraviolet curable paint on a surface of the wear-resistant layer of the die-formed chamfered workpiece, and curing the ultraviolet curable paint by irradiating with an ultraviolet lamp to form an ultraviolet cured paint layer on the surface of the wear-resistant layer. In some embodiments, the ultraviolet curable paint comprises a primer paint and a topcoat paint, and the coating with the ultraviolet curable paint specifically includes applying the primer paint and the topcoat paint onto the surface of the wear-resistant layer sequentially, and curing by irradiating with an ultraviolet lamp, to form a primer layer and a topcoat layer on the surface of the wear-resistant layer sequentially. In some embodiments, the primer paint and the topcoat paint are applied independently in an amount of 6-8 $g/m^2$, and preferably 7 $g/m^2$. There is no special restriction on the types of the primer paint and the topcoat paint in the present disclosure, and primer paints and topcoat paints well known to those skilled in the art could be used. There is no special restriction on operating conditions for the curing by irradiating with an ultraviolet lamp in the present disclosure, and operating conditions well known to those skilled in the art may be used.

After the coating with the ultraviolet curable paint, the workpiece coated with the ultraviolet curable paint is subjected to the slicing and the tenoning in sequence to obtain the die-formed chamfered plastic floor. There is no special restriction on the slicing and the tenoning in the present disclosure, and slicing and tenoning may be carried out according to product specification by using a method well known to those skilled in the art. In the present disclosure, a chamfer is formed through the die forming-chamfering, and therefore there is no need to cut an inclined plane with a certain angle and width by using an additional cutter as done in the traditional preparation process to realize the chamfering effect.

The technical solutions of the present disclosure will be clearly and completely described below with reference to examples. Obviously, described examples are only a part, not all of examples of the present disclosure. All other examples obtained by those of ordinary skill in the art based on the examples described herein without paying creative work shall fall within the scope of the present disclosure.

Example 1

In parts by mass, 100 parts of PVC, 350 parts of calcium carbonate, 8 parts of a calcium zinc composite stabilizer, 2.5 parts of an external lubricant, 2.2 parts of an internal lubricant, and 5 parts of a processing agent were mixed, and stirred at 600 r/min until the temperature of the materials was 110° C. The materials were further stirred at a rate of 300 r/min until the temperature of the materials was 55° C., obtaining a mixed material.

The mixed material was extruded under conditions of a temperature of 180° C., a host rotating speed of 23 r/min and a current of 130 A, obtaining a matrix plate.

A color film and a wear-resistant layer were laminated sequentially onto one side of the matrix plate at a temperature of 170° C., obtaining a laminated embossed workpiece.

The laminated embossed workpiece was pressed by using a steel plate engraved with a chamfer frame (as shown in FIG. 1) under conditions: first at a temperature of 125° C. and a pressure of 5 MPa for 6 s, and then at a temperature of 125° C. and a pressure of 18 MPa for 4 s to form a chamfer embossing on a surface thereof, such that the laminated embossed workpiece had a chamfer, obtaining a die-formed chamfered workpiece, wherein the chamfer in the die-formed chamfered workpiece had a depth of 1.0 mm.

A surface of the wear-resistant layer of the die-formed chamfered workpiece was sequentially coated with a primer paint and a topcoat paint in an amount of 7 $g/m^2$ respectively, and the primer paint and the topcoat paint were cured by irradiating with an ultraviolet lamp, forming a primer layer and a topcoat layer sequentially on the surface of the wear-resistant layer, thereby obtaining a workpiece coated with the ultraviolet curable paint.

The workpiece coated with the ultraviolet curable paint was sliced and tenoned sequentially according to product specification, obtaining a die-formed chamfered plastic floor.

FIGS. 2-6 are diagrams showing assembling effects of the die-formed chamfered plastic floor. As can be seen from FIGS. 2-6, the method according to the present disclosure enables the die-formed chamfered plastic floor to have a strong three-dimensional chamfering effect, such that the die-formed chamfered plastic floor exhibits a manual chamfering effect of solid wood floor, and thereby provides stronger senses of solid wood and design.

Example 2

In parts by mass, 100 parts of PVC, 300 parts of calcium carbonate, 10 parts of a calcium zinc composite stabilizer, 2.7 parts of an external lubricant, 2.0 parts of an internal lubricant, and 8 parts of a processing agent were mixed, and stirred at 600 r/min until the temperature of the materials was 110° C. The materials were further stirred at 300 r/min until the temperature of the materials was 55° C., obtaining a mixed material.

The mixed material was extruded under conditions of a temperature of 200° C., a host rotating speed of 18 r/min and a current of 110 A, obtaining a matrix plate.

A color film and a wear-resistant layer were laminated sequentially onto one side of the matrix plate at a temperature of 180° C., obtaining a laminated embossed workpiece.

The laminated embossed workpiece was pressed by using a steel plate engraved with a chamfer frame under conditions: first at a temperature of 125° C. and a pressure of 5 MPa for 6 s, and then at a temperature of 125° C. and a pressure of 18 MPa for 4 s to form a chamfer embossing on a surface thereof, such that the laminated embossed workpiece had a chamfer, obtaining a die-formed chamfered workpiece, wherein the chamfer in the die-formed chamfered workpiece had a depth of 1.0 mm.

A surface of the wear-resistant layer of the die-formed chamfered workpiece was sequentially coated with a primer paint and a topcoat paint in an amount of 7 g/m² respectively, and the primer paint and the topcoat paint were cured by irradiating with an ultraviolet lamp, forming a primer layer and a topcoat layer sequentially on the surface of the wear-resistant layer, thereby forming a workpiece coated with the ultraviolet curable paint.

The workpiece coated with the ultraviolet curable paint was sliced and tenoned sequentially according to product specification, obtaining a die-formed chamfered plastic floor.

Example 3

In parts by mass, 100 parts of PVC, 200 parts of calcium carbonate, 10 parts of a calcium zinc composite stabilizer, 2.5 parts of an external lubricant, 2.2 parts of an internal lubricant, and 12 parts of a processing agent were mixed, stirred at 600 r/min until the temperature of the materials was 110° C. The materials were further stirred at 300 r/min until the temperature of the materials was 55° C., obtaining a mixed material.

The mixed material was extruded under conditions of a temperature of 180° C., a host rotating speed of 20 r/min and a current of 120 A, obtaining a matrix plate.

A color film and a wear-resistant layer were laminated sequentially onto one side of the matrix plate at a temperature of 200° C., obtaining a laminated embossed workpiece.

The laminated embossed workpiece was pressed by using a steel plate engraved with a chamfer frame (as shown in FIG. 1) under conditions: first at a temperature of 125° C. and a pressure of 5 MPa for 6 s, and then at a temperature of 125° C. and a pressure of 18 MPa for 4 s to form a chamfer embossing on a surface thereof, such that the laminated embossed workpiece had a chamfer, obtaining a die-formed chamfered workpiece, wherein the chamfer in the die-formed chamfered workpiece had a depth of 1.0 mm.

A surface of the wear-resistant layer of the die-formed chamfered workpiece was sequentially coated with a primer paint and a topcoat paint in an amount of 7 g/m² respectively, and the primer paint and the topcoat paint were cured by irradiating with an ultraviolet lamp, forming a primer layer and a topcoat layer sequentially on the surface of the wear-resistant layer, thereby forming a workpiece coated with the ultraviolet curable paint.

The workpiece coated with the ultraviolet curable paint was sliced and tenoned sequentially according to product specification, obtaining a die-formed chamfered plastic floor.

Comparative Example 1

A die-formed chamfered plastic floor was prepared according to the method of Example 1, except that the laminated embossed workpiece was pressed at a temperature of 140° C. and a pressure of 18 MPa for 20 s. The obtained die-formed chamfered workpiece had a chamfering effect meeting the requirements, but the surface thereof was scalded and the matrix was cracked.

Comparative Example 2

A die-formed chamfered plastic floor was prepared according to the method of Example 1, except that the laminated embossed workpiece was pressed at a temperature of 120° C. and a pressure of 10 MPa for 10 s. The obtained die-formed chamfered workpiece had a chamfering effect that did not meet the requirements, and the surface thereof was not scalded and the matrix was not cracked.

Comparative Example 3

A die-formed chamfered plastic floor was prepared according to the method of Example 1, except that the laminated embossed workpiece was pressed at a temperature of 125° C. and a pressure of 18 MPa for 10 s. The obtained die-formed chamfered workpiece had a chamfering effect meeting the requirements, the surface thereof was not scalded but the matrix was cracked.

The foregoing descriptions are merely preferred embodiments of the present disclosure. It should be noted that those of ordinary skill in the art may make a number of improvements or refinements without departing from the principle of the present disclosure. These improvements or refinements should also fall within the scope of the present disclosure.

What is claimed is:

1. A die-formed chamfered plastic floor, which has a chamfer in a depth of 0.6-1.2 mm and with a regular or special shape, and is prepared by a method comprising
   mixing raw materials for preparing a plastic floor matrix, to obtain a mixed material; and
   subjecting the mixed material to an extrusion, a laminating-embossing treatment, a die forming-chamfering treatment, a coating with an ultraviolet curable paint, a slicing, and a tenoning in sequence, to obtain the die-formed chamfered plastic floor;
   wherein the raw materials for preparing the plastic floor matrix comprise, in parts by mass, 100 parts of polyvinyl chloride, 300-400 parts of calcium carbonate, 5-10 parts of a stabilizer, 0.6-6 parts of a lubricant, and 5-20 parts of a processing agent.

2. The die-formed chamfered plastic floor of claim 1, wherein the mixing is carried out by a high-rate stirring and a low-rate stirring in sequence, the high-rate stirring having a rate of 550-650 r/min, and the low-rate stirring having a rate of 250-350 r/min.

3. The die-formed chamfered plastic floor of claim 1, wherein the extrusion is carried out under conditions comprising a temperature of 150-210° C., a host rotating speed of 18-25 r/min, and a current of 110-160 A.

4. The die-formed chamfered plastic floor of claim 1, wherein the laminating-embossing treatment comprises at a temperature of 150-200° C., laminating a color film and a wear-resistant layer onto one side of a matrix plate obtained from the extrusion.

5. The die-formed chamfered plastic floor of claim 1, wherein the die forming-chamfering treatment comprises pressing a laminated embossed workpiece obtained from the laminating-embossing treatment by using a template engraved with a chamfer frame, to form a chamfer embossing on a surface of the laminated embossed workpiece, such that the laminated embossed workpiece has a chamfer.

6. The die-formed chamfered plastic floor of claim 5, wherein the pressing comprises a first pressing and a second pressing carried out sequentially, wherein the first pressing is carried out at a temperature of 120-130° C. and a pressure of 4-6 MPa for 5-10 s, and the second pressing is carried out at a temperature of 120-130° C. and a pressure of 10-19 MPa for 3-8 s.

7. The die-formed chamfered plastic floor of claim 4, wherein the coating with the ultraviolet curable paint comprises
applying an ultraviolet curable paint onto a surface of the wear-resistant layer of a die-formed chamfered workpiece obtained from the die forming-chamfering treatment, and curing by irradiating with an ultraviolet lamp, to form an ultraviolet cured paint layer on the surface of the wear-resistant layer.

8. The die-formed chamfered plastic floor of claim 7, wherein the ultraviolet curable paint comprises a primer paint and a topcoat paint, and the coating with the ultraviolet curable paint specifically comprises
applying the primer paint and the topcoat paint onto a surface of the wear-resistant layer sequentially in an independent amount of 6-8 g/m$^2$ respectively, and curing by irradiating with an ultraviolet lamp, to form a primer layer and a topcoat layer on the surface of the wear-resistant layer sequentially.

* * * * *